US008609179B2

(12) United States Patent
Kurth et al.

(10) Patent No.: US 8,609,179 B2
(45) Date of Patent: *Dec. 17, 2013

(54) HIGH THROUGHPUT AUTOMATED APPARATUS, METHOD AND SYSTEM FOR COATING EARS OF CORN

(75) Inventors: David Kurth, Grimes, IA (US); Thomas Edwin Arneson, Marshalltown, IA (US); Kirk David Shirar, Marshalltown, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 600 days.

This patent is subject to a terminal disclaimer.

(21) Appl. No.: 12/545,252

(22) Filed: Aug. 21, 2009

(65) Prior Publication Data

US 2010/0047442 A1 Feb. 25, 2010

Related U.S. Application Data

(60) Provisional application No. 61/090,979, filed on Aug. 22, 2008.

(51) Int. Cl.
*A01N 3/00* (2006.01)

(52) U.S. Cl.
USPC ............................................... 427/4; 427/128

(58) Field of Classification Search
USPC ............................................................ 427/4
See application file for complete search history.

(56) References Cited

U.S. PATENT DOCUMENTS 1,618,159 A * 2/1927 Ahlburg ........................ 426/307
1,692,286 A * 11/1928 Brogden ....................... 426/305
2,141,550 A * 12/1938 Paxton .......................... 118/684
2,675,942 A 4/1954 Vogelsang
2,903,996 A * 9/1959 Schwebs ......................... 118/23
3,195,485 A 7/1965 Reynolds
3,217,421 A * 11/1965 Lowe et al. ..................... 34/428
3,363,486 A 1/1968 Tourison (Continued)

FOREIGN PATENT DOCUMENTS

DE 196 16 216 A1 10/1997
EP 0611604 A3 8/1994

(Continued)

OTHER PUBLICATIONS

International Search Report and favorable Written Opinion for Application No. PCT/US2009/054652 mailed Mar. 31, 2010.

(Continued)

*Primary Examiner* — Timothy Meeks
*Assistant Examiner* — Mandy Louie
(74) *Attorney, Agent, or Firm* — Ballard Spahr LLP

(57) ABSTRACT

Apparatuses, methods and systems for applying a coating to an ear of corn in a high throughput manner are disclosed. The system includes means for moving the ear of corn through the system and means for coating the ear of corn with a coating while passing through the system. The apparatus includes a carrying position for an ear of corn, an automated line having a plurality of the carrying positions, and an automated coating station adapted to apply a coating to the ear of corn on the automated line. The method includes staging a plurality of ears of corn on an automated line, passing the automated line through an ear coating process, and coating the plurality of ears of corn with a coating.

11 Claims, 8 Drawing Sheets

(56) References Cited

U.S. PATENT DOCUMENTS

| | | | | | |
|---|---|---|---|---|---|
| 3,460,492 | A | * | 8/1969 | Dickinson et al. | 111/200 |
| 3,530,372 | A | | 9/1970 | Laukien | |
| 3,572,548 | A | | 3/1971 | Fuchs | |
| 3,818,859 | A | * | 6/1974 | Kalmar | 118/24 |
| 3,884,347 | A | | 5/1975 | Gallagher et al. | |
| 3,993,788 | A | | 11/1976 | Longenecker | |
| 4,225,031 | A | * | 9/1980 | Frisbie et al. | 198/395 |
| 4,230,983 | A | | 10/1980 | Steere et al. | |
| 4,291,472 | A | * | 9/1981 | Lewis | 34/475 |
| 4,301,762 | A | | 11/1981 | Burnett, Jr. | |
| 4,377,649 | A | * | 3/1983 | Sweeney et al. | 524/49 |
| 4,413,014 | A | | 11/1983 | Melancon | |
| 4,602,716 | A | | 7/1986 | Barla-Szabo et al. | |
| 5,238,121 | A | * | 8/1993 | Frisbie | 209/539 |
| 5,341,914 | A | | 8/1994 | DeMars et al. | |
| 5,677,474 | A | | 10/1997 | Rogers | |
| 6,299,368 | B1 | | 10/2001 | Tavularis | |
| 6,307,123 | B1 | | 10/2001 | Kriz et al. | |
| 6,537,826 | B1 | | 3/2003 | Horigane | |
| 6,646,264 | B1 | | 11/2003 | Modiano et al. | |
| 6,705,827 | B2 | | 3/2004 | Keller et al. | |
| 6,706,989 | B2 | | 3/2004 | Hunter et al. | |
| 6,809,819 | B1 | | 10/2004 | Vinjamoori et al. | |
| 6,865,556 | B2 | | 3/2005 | Penner et al. | |
| 6,959,617 | B2 | | 11/2005 | Deppermann | |
| 7,044,306 | B2 | | 5/2006 | Deppermann et al. | |
| 7,067,834 | B2 | | 6/2006 | Horigane et al. | |
| 7,290,665 | B2 | | 11/2007 | Hunter et al. | |
| 7,367,155 | B2 | | 5/2008 | Kotyk et al. | |
| 7,502,113 | B2 | | 3/2009 | Deppermann et al. | |
| 7,588,151 | B2 | | 9/2009 | Hunter et al. | |
| 7,591,101 | B2 | | 9/2009 | Deppermann et al. | |
| 7,591,374 | B2 | | 9/2009 | Hunter et al. | |
| 7,600,642 | B2 | | 10/2009 | Deppermann et al. | |
| 7,611,842 | B2 | | 11/2009 | Deppermann et al. | |
| 7,685,768 | B2 | | 3/2010 | Deppermann et al. | |
| 7,703,238 | B2 | | 4/2010 | Deppermann et al. | |
| 7,767,883 | B2 | | 8/2010 | Deppermann et al. | |
| 7,830,516 | B2 | | 11/2010 | Deppermann et al. | |
| 7,832,143 | B2 | | 11/2010 | Deppermann et al. | |
| 7,849,632 | B2 | | 12/2010 | Deppermann et al. | |
| 7,877,926 | B2 | | 2/2011 | Deppermann et al. | |
| 7,905,050 | B2 | | 3/2011 | Hunter et al. | |
| 7,934,600 | B2 | | 5/2011 | Deppermann et al. | |
| 7,941,969 | B2 | | 5/2011 | Deppermann et al. | |
| 7,998,669 | B2 | | 8/2011 | Deppermann et al. | |
| 7,998,699 | B2 | | 8/2011 | Deppermann et al. | |
| 8,028,469 | B2 | | 10/2011 | Deppermann et al. | |
| 8,031,910 | B2 | | 10/2011 | Jones et al. | |
| 8,071,845 | B2 | | 12/2011 | Deppermann et al. | |
| 8,076,076 | B2 | | 12/2011 | Osborn et al. | |
| 8,245,439 | B2 | | 8/2012 | Deppermann et al. | |
| 8,281,935 | B2 | | 10/2012 | Deppermann et al. | |
| 2004/0131734 | A1 | * | 7/2004 | Petcavich | 426/268 |
| 2004/0267457 | A1 | | 12/2004 | Timmis et al. | |
| 2006/0042527 | A1 | | 3/2006 | Deppermann | |
| 2006/0046244 | A1 | | 3/2006 | Deppermann et al. | |
| 2006/0222958 | A1 | | 10/2006 | Yamaguchi et al. | |
| 2007/0048872 | A1 | | 3/2007 | Deppermann et al. | |
| 2007/0207485 | A1 | | 9/2007 | Deppermann et al. | |
| 2007/0252006 | A1 | * | 11/2007 | Heck et al. | 235/455 |
| 2008/0113367 | A1 | | 5/2008 | Becker et al. | |
| 2008/0131254 | A1 | | 6/2008 | Cope et al. | |
| 2008/0131924 | A1 | | 6/2008 | Cope et al. | |
| 2009/0061449 | A1 | | 3/2009 | Chung et al. | |
| 2009/0155878 | A1 | | 6/2009 | Becker et al. | |
| 2009/0252880 | A1 | | 10/2009 | Kurth | |
| 2010/0044356 | A1 | | 2/2010 | Cope | |
| 2010/0086963 | A1 | | 4/2010 | Deppermann et al. | |
| 2010/0299790 | A1 | | 11/2010 | Deppermann et al. | |
| 2011/0081716 | A1 | | 4/2011 | Deppermann et al. | |
| 2011/0117570 | A1 | | 5/2011 | Cope et al. | |
| 2011/0129836 | A1 | | 6/2011 | Deppermann et al. | |
| 2011/0160068 | A1 | | 6/2011 | Becker et al. | |
| 2011/0217700 | A1 | | 9/2011 | Deppermann et al. | |
| 2011/0225680 | A1 | | 9/2011 | Cope | |
| 2011/0296930 | A1 | | 12/2011 | Deppermann et al. | |
| 2012/0079629 | A1 | | 3/2012 | Deppermann et al. | |
| 2012/0180386 | A1 | | 7/2012 | Deppermann et al. | |

FOREIGN PATENT DOCUMENTS

| | | | |
|---|---|---|---|
| EP | 1 346 206 | B1 | 9/2003 |
| EP | 1 391 713 | A2 | 2/2004 |
| GB | 2 293 744 | A | 4/1996 |
| GB | 2293744 | A | 4/1996 |
| KR | 10-1999-0022713 | A | 3/2000 |
| KR | 10-2000-0022775 | | 11/2001 |
| KR | 339689 | B | 6/2002 |
| RU | 2187919 | C2 | 8/2002 |
| SU | 1805835 | A3 | 3/1993 |
| WO | WO 03/084847 | A2 | 10/2003 |
| WO | WO-2006/022958 | A1 | 3/2006 |
| WO | WO 2006/026466 | A2 | 3/2006 |
| WO | WO 2006/026467 | A2 | 3/2006 |
| WO | WO 2007/025250 | A2 | 3/2007 |
| WO | WO 2007/103769 | A2 | 9/2007 |
| WO | WO 2007/103786 | A2 | 9/2007 |
| WO | WO-2007/103786 | A2 | 9/2007 |
| WO | WO 2008/150798 | A1 | 12/2008 |
| WO | WO-2008/150798 | A1 | 12/2008 |
| WO | WO 2009/032741 | A2 | 3/2009 |

OTHER PUBLICATIONS

International Search Report for International Appl. No. PCT/US2009/039725, mailed Jun. 2, 2009.

Aitken-Christie, J. et al., *Automation in Plant Tissue Culture*, Automation and Environmental Control in Plant tissue Culture (1995) 1-18.

Casady, W. W. et al., *An Automated Kernel Positioning Device for Computer Vision Analysis of Grain*, American Society of Agricultural Engineers, vol. 32(5) (1989) 1821-1826.

Chunwongse, J. et al., *Pre-Germation Genotypic Screening Using PCR Amplification of Half-Seeds*, Theor Appl Genet, 86 (1993) 694-698.

Churchill, D. B. et al., *Rotating Table for Measuring Seed Physical Properties*, Transactions of the ASAE, vol. 34(4) (1991) 1842-1845.

Dekkers, J. C. M. et al., *The Use of Molecular Genetics in the Improvement of Agricultural Populations*, Nature Reviews | Genetics, vol. 3, (2002) 22-32.

Gasvoda, D. et al., *Whiteback Pine Seed Scarifier*, United States Department of Agriculture Food Service, Technology & Development Program, Timber Tech Tips, 0224-2332-MTDC (2002) pp. 1-6.

Hahnen, S. et al., *Automated DNA Preparation from Maize Tissues and Food Samples Suitable for Real-time PCR Detection of Native Genes*, European Food Research Technology, vol. 215 (2002) 443-446.

Higley, P.M., et al., *Effects of Non-Destructive Tissue Extraction on the Viability of Corn, Soybean and Bean Seeds*, Seed Sci. & Technol., 22 (1994) 245-252.

Horigane, A. et al., *Evaluation of Color Characteristics of Cross-Sectioned Wheat Kernels*, Food Sci. Technol. Res., 9:4 (2003), 327-331.

Horigane, A. et al., *Measurement of Brightness of Cross-Sectioned Wheat Kernels*, Japanese Journal of Crop Science, vol. 72, (attachment No. 1) (2003) 176-177.

Horigane, A. et al., *Two-Dimensional Analysis of Kernels Using a New Sample Preparation Method*, Chemistry and Biology, vol. 41, No. 6 (2003) 398-402.

Kamiya, M. et al., *Rapid DNA Extraction Method from Soybean Seeds*, Breeding Science 53 (2003) 277-279.

Kang, H.W. et al., *A Rapid DNA Extraction Method for RFLP and PCR Analysis from a Single Dry Seed*, Plant Molecular Biology Reporter, 16:90 (1998) 1pg.

Kerk, N.M. et al., *Laser Capture Microdissection of Cells from Plant Tissues*, Plant Physiology, vol. 132 (2003) 27-35.

Krvsan, P., *Ice-Cap. A High-Throughput Method for Capturing Plant Tissue Samples for Genotype Analysis*, Plant Physiology, vol. 135 (2004) 1162-1169.

(56) References Cited

OTHER PUBLICATIONS

Liu, W. et al., *Highly Efficient Doubled-Haploid Production in Wheat via Induced Microsphere Embryogenesis*, Crop Science, vol. 42 (2002) 686-692.

McCarthy, P. L. et al., *Rapid Identfication of Transformed Wheat Using a Half-Seed PCR Assay*, BioTechniques 32 (2002)560-564.

Pearson, T.C. et al., *Reduction of Aflatoxin and Fumonisin Contamination in Yellow Corn by High-Speed Dual-Wavelength Sorting*, Cereal Chem. 81(4), (2004) 490-498.

Peterhansel, C. et al., *Quantitative Detection of transgenic and Endogenous DNA Sequences in Seeds After Automated DNA Preparation*, Biomed. Eng. Appl. Basis Commun. 16 (2004) 1-6.

Rafalkski, J. A., *Genetic Diagnostics in Plant Breeding: RADs Microsatellites & Machines*, TIG, vol. 9, No. 8 (Aug. 1993) 275-280.

Sangtong, V. et al., *Serial Extraction of Endosperm Drilling (SEED)—A Method for Detecting Transgenes and Proteins in Single Viable Maize Kernels*, Plant Molecular Biology Reporter 19 (2001) 151-158.

Skinner, D. Z. et al., *Segregation and Conditioning Probability Association of Molecular Markers With Traits in Autotetraploid Alfalfa*, Molecular Breeding, vol. 5 (2000) 295-306.

Smith, J. S. C. et al., *Genetic Purity and Testing Technologies for Seed Quality: A Company Perspective*, Seed Science Research 8 (1998) 285-293.

Sweeney, P. et al., *Random Amplified Polymorphic DNA Analysis of Dry Turfgrass Seed*, HortScience 31(3), (1996) 400-401.

Turner, N.A., et al., *Sampling and Analysis for Determining Relationship of Calcium Concentration to Bitter Pit in Apple Fruit*, New Zealand Journal of Agricultural Research 20:4 (1977) 525-532.

Von Post, R. et al., *A High-throughput DNA Extraction Method for Barley Seed*, Euphytica, 130 (2003) 255-260.

Wang, G.L., et al., *PCR Amplification from Single Seeds, Facilitating DNA Marker-Assisted Breeding*, Nucleic Acids Research 21(10), (1993) 2527.

Wenxue, Z., et al., *PCR Analysis of Half-Seeds of Cereal Crops and Its Application in Marker-assisted Selection and Breeding*, Chinese Journal of Biotechnology, 12:4 (1997) 249-255.

Xu, Y., *Developing Marker-Assisted Selection Strategies for Breeding Hybrid Rice*, Plant Breeding Review, 23 (2003) 73-174.

Yang, W, et al., *A Preliminary Study of Non-Lethal Specific Sampling of Corn Embryo and Endosperm and Feasibility of Automating the Seed Selection Process Utilizing the Specific Sampling Technique*, Pioneer Hi-Bred (2002) 1-41.

Wang, J. et al., *Identification of Parents of F1 Hybrids Through SSR Profiling of Material and Hybrid Tissue*, Euphutica, vol. 124 (2002) 29-34.

Yao, Y. et al., *Single Kernel Sampling Method for Maize Starch Analysis While Maintaining Kernel Vitality*, Cereal Chem. 79:6 (2002) 757-762.

DuPont CoatingSolutions [online] [retrieved Apr. 4, 2013]. Retrieved from the Internet: <URL: www.ccaiweb.com/PDF/MembersOnly/annualpres08/DuPont CoatingSolutions—Corporate Member Presentation.pdf>. (undated) 12 pages.

200 watt CO2 laser from Synrad provides the best cost per delivered watt available in today . . . [online] [retrieved Dec. 18, 2012]. Retrieved from the Internet: <URL: http://www.synrad.com/fseries/f201.htm>. (2011) 2 pages.

Skinner, D. Z. et al., *Segregation and Conditioning Probability Association of Molecular Markers With Traits in Autotetraploid Alfalfa*, Molecular Breeding, vol. 6 (2000) 295-306.

* cited by examiner

HIGH THROUGHPUT AUTOMATED APPARATUS, METHOD AND SYSTEM FOR COATING EARS OF CORN

RELATED APPLICATIONS

This application claims priority under 35 U.S.C. §119 to provisional application Ser. No. 61/090,979 filed Aug. 22, 2008, which application is hereby incorporated by reference in its entirety.

FIELD OF THE INVENTION

The present invention relates to apparatuses, methods and systems for coating ears of corn, and particularly, apparatuses, methods and systems for applying a magnetically active coating to the crown of corn kernels on an ear of corn.

BACKGROUND

The process of orienting seed corn for sampling purposes has been predominantly accomplished using manual techniques. Automatic orientation by magnetism is shown and described in U.S. application Ser. Nos. 11/939,380 and 11/939,402, both filed Nov. 13, 2007 and U.S. application Ser. No. 11/939,380 filed Nov. 13, 2007. Automatic orientation by magnetic attenuation has many advantages as described and set forth in the aforementioned applications. U.S. Provisional application Ser. No. 12/419,690, filed Apr. 7, 2009 describes a manually operated apparatus for applying a magnetically active coating to the crown of corn kernels on an ear of corn. Thus, a need has been identified in the art for providing an automated apparatus, method and system for high throughput application of a magnetically active coating to an ear of corn to attract, position, orient, and secure kernels by magnetic attenuation.

Current apparatuses, methods and systems for coating an ear of corn require the ear of corn to be handled extensively during the coating process. Therefore, a need in the art has been identified for providing apparatuses, methods and systems for coating an ear of corn that does not require extensive handling and thus avoids the inherent inefficiencies associated with such handling in order to adequately coat ears of corn with a coating for use in subsequent applications facilitating handling of the individual kernels.

Hand coating according to the current state of the art results in uneven and inconsistent coating of the ear of corn and reduces throughput times. Additionally, air drying requires the ears of corn to sit idle while they dry. Therefore a need in the art has been identified for providing an apparatus, method and system for automated coating and drying an ear of corn, thereby improving the consistency and throughput of the process.

Magnetically active coatings, such as iron-based paints are inherently high-viscosity liquids. Due to viscosity, application of these coatings can be problematic. Therefore, a need has been identified in the art to provide apparatuses, methods and systems to evenly coat an ear of corn with a magnetically active coating.

Coated ears of corn require time for drying before being handled or put within an envelope or other container for storing and identifying the ear of corn. Existing apparatuses rely on air drying, as air varies with local climate and conditions, it is preferable to have a controlled drying climate. Therefore, a need has been identified in the art to provide an apparatus, method and system for controlled drying of multiple ears of corn and for tracking, identifying, and indexing the ears of corn during and after being dried.

BRIEF SUMMARY OF THE INVENTION

An apparatus, method and system for coating ears of corn is disclosed. According to one aspect, a system for resource-efficient coating of an ear of corn is disclosed. The system includes means for moving the ear of corn through the system and means for coating the ear of corn with a coating while passing through the system. In a preferred form, the system also includes means for drying the coating on the ear of corn.

In another aspect, an automated machine for high throughput coating of an ear of corn is disclosed. The machine includes a carrying position for an ear of corn, an automated line having a plurality of the carrying positions, and an automated coating station adapted to apply a coating to the ear of corn on the automated line. In a preferred form, the machine also includes an automated drying station on the automated line. The automated drying station is adapted to dry the coating on the ear of corn.

Methods for high throughput coating of ears of corn are also disclosed. The method includes staging a plurality of ears of corn on an automated line, passing the automated line through an ear coating process, and coating the plurality of ears of corn with a coating. In a preferred form, the method also includes the steps of drying the plurality of ears of corn with a dryer and indexing at least one of the ears of corn with a position of the ear of corn on the automated line using an identifier.

DETAILED DESCRIPTION

Figure 1:
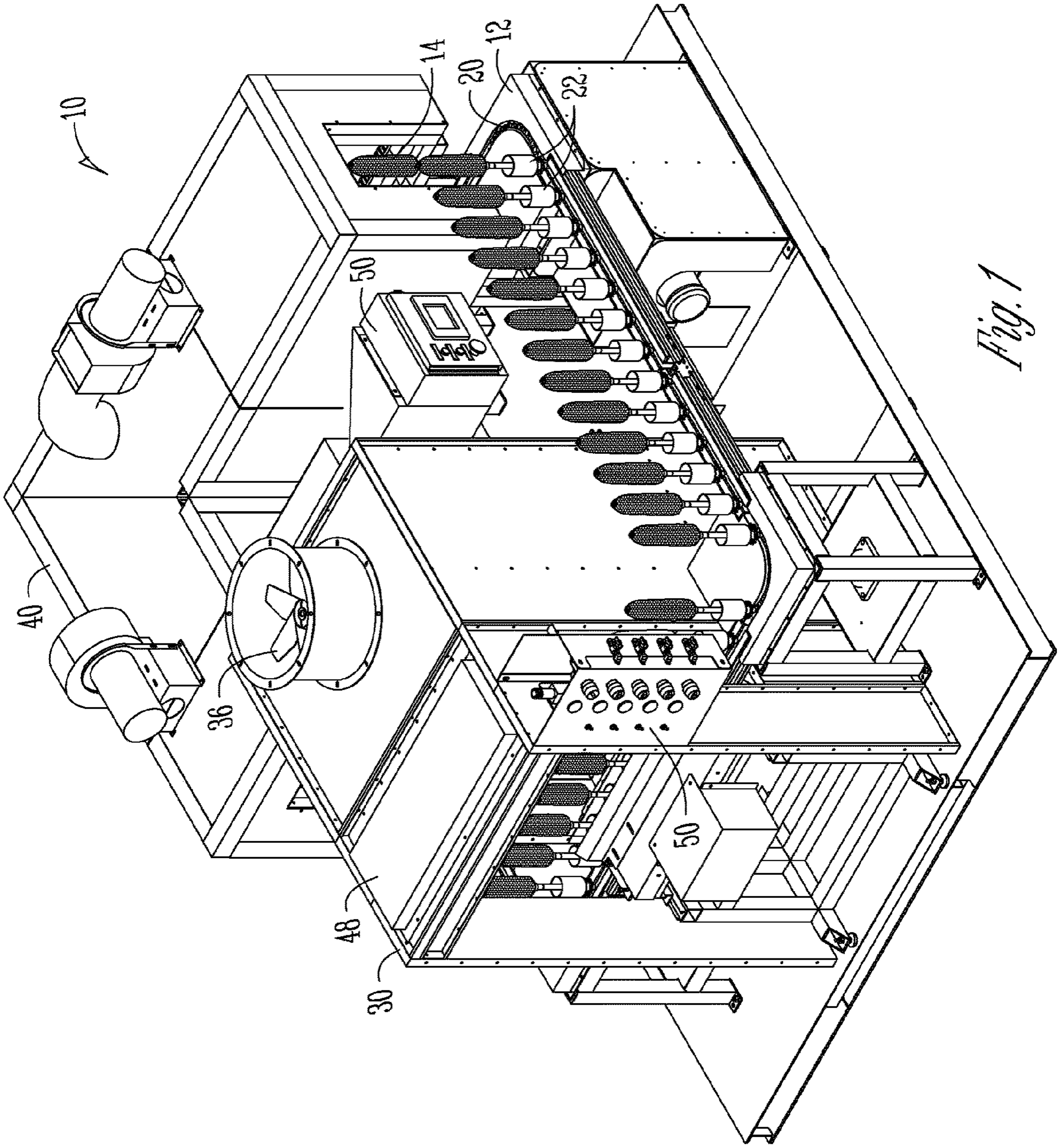
FIG. 1 is an isometric view of an apparatus and system for applying a coating to an ear of corn according to the preferred embodiment.

The following description is merely exemplary in nature and is not intended to limit the present disclosure, application, or uses.

For a better understanding of the invention, several exemplary embodiments will now be described in detail. Reference will be taken from time-to-time to the appended drawings. Reference numerals will be used to indicate certain parts or locations in the drawings. These same reference numerals will indicate the same parts or locations throughout the drawings, unless otherwise indicated.

Apparatus

FIG. 1 is a perspective view of apparatus 10 for applying a coating 16 to an ear of corn 14. Apparatus 10 includes an elevated work surface or table 12, a chain drive 20 traversing the perimeter of the table 12, a paint station 30 and a pair of dryers 40, through which the chain drive 20 passes. While it is preferred that table 12 be elevated to a comfortable working position for a standing operator, this is not required. The table 12 may further be either freestanding or incorporated into existing process flow. Those skilled in the art will appreciate that the table 12 may be constructed of wood, aluminum, stainless steel, or other known commercially available product. Paint station 30 includes an enclosure 38 which may be configured as either partially or fully enclosed. For example, if enclosure 38 is configured as fully enclosed, access points could be incorporated into enclosure 38 to provide user access into enclosure 38 for maintenance. Further, enclosure 38 would require a means for the chain drive 20 to enter and exit the enclosure 38. Enclosure 38 may also include one or more access points, for example, provided by a hinged door, to allow partial or full access to enclosure 38. Those skilled in the art can appreciate that enclosure 38 may be transparent, translucent, or opaque, as preferred. Enclosure 38 is further preferred to be configured to be a ventilated enclosure, including ventilation 36. Dryers 40 are also substantially fully enclosed, allowing an opening only through which the chain drive 20 and ear of corn 14 may pass. Those familiar with high throughput processes should appreciate that the dryers 40 may be configured for maintenance access as well. Finally, apparatus 10 includes a number of controls 50 for controlling the various aspects of the invention. These controls include, but are not limited to, altering the speed of the chain drive 20, managing the sprayers 32 in paint station 30, controlling, engaging, or disengaging ventilation from paint station 30 or dryers 40, or manipulating the internal condition of dryers 40, either individually or together. The controls allow an operator to monitor the system during operation and adjust the components as necessary, thereby reducing the need for high technical expertise and minimizing operator skill level in system start-up.

Figure 2:
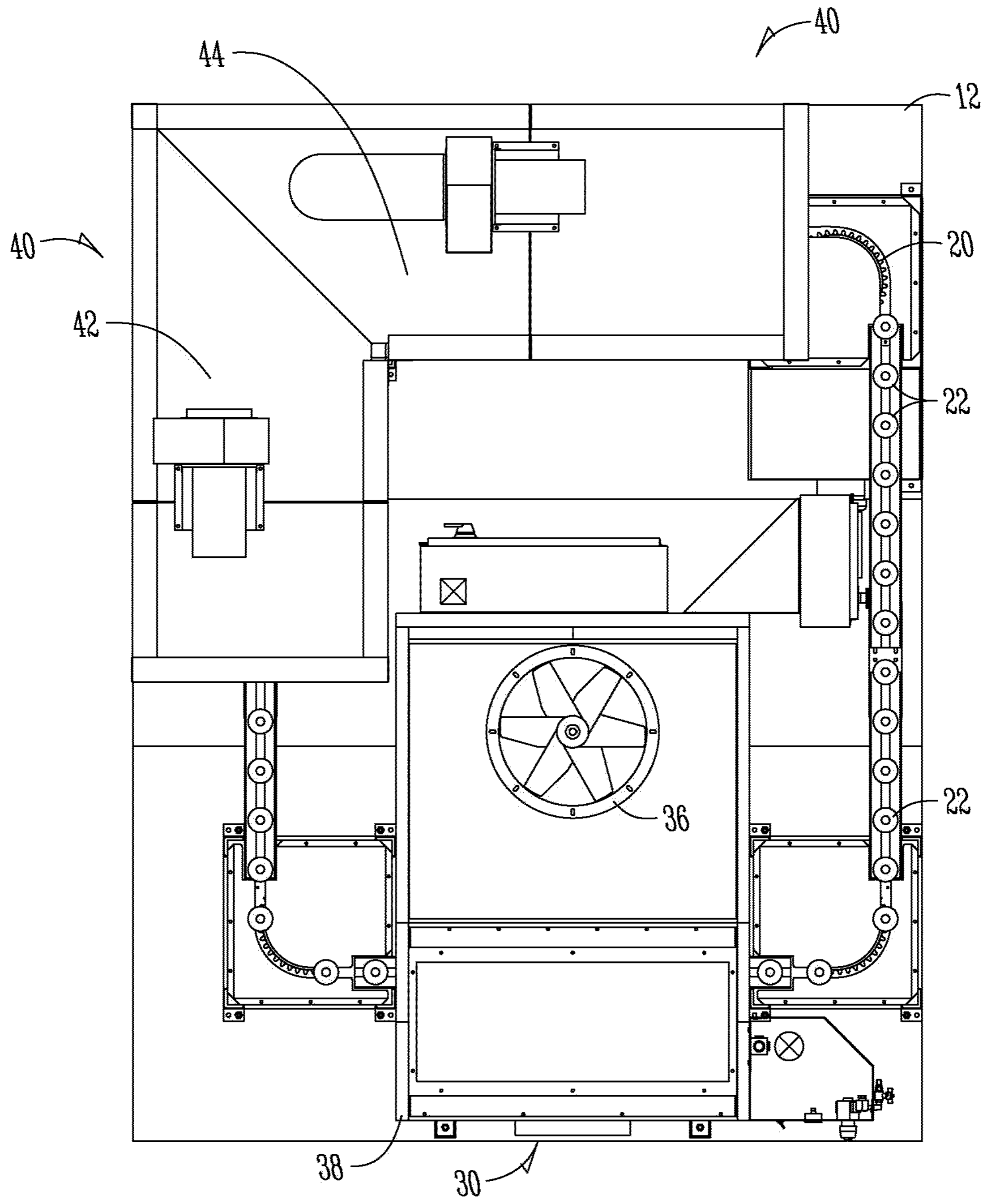
FIG. 2 is a top view of the apparatus shown in FIG. 1.
Figure 3:
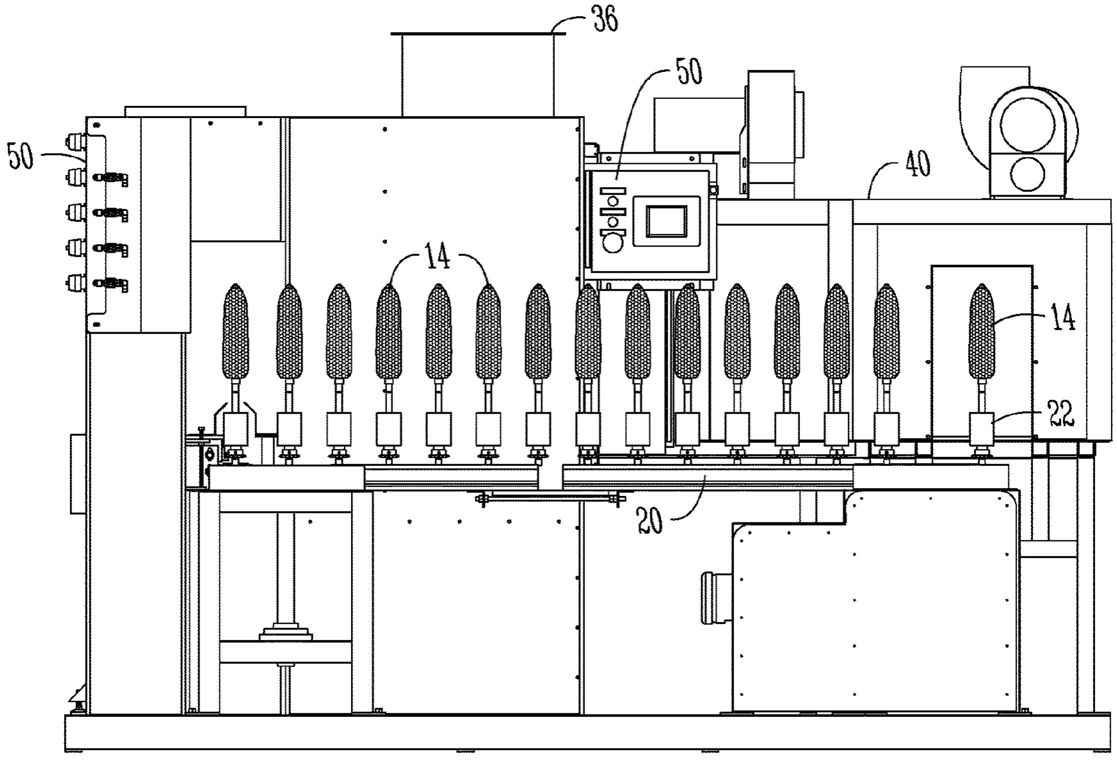
FIG. 3 is a front view of the apparatus shown in FIG. 1.
Figure 4:
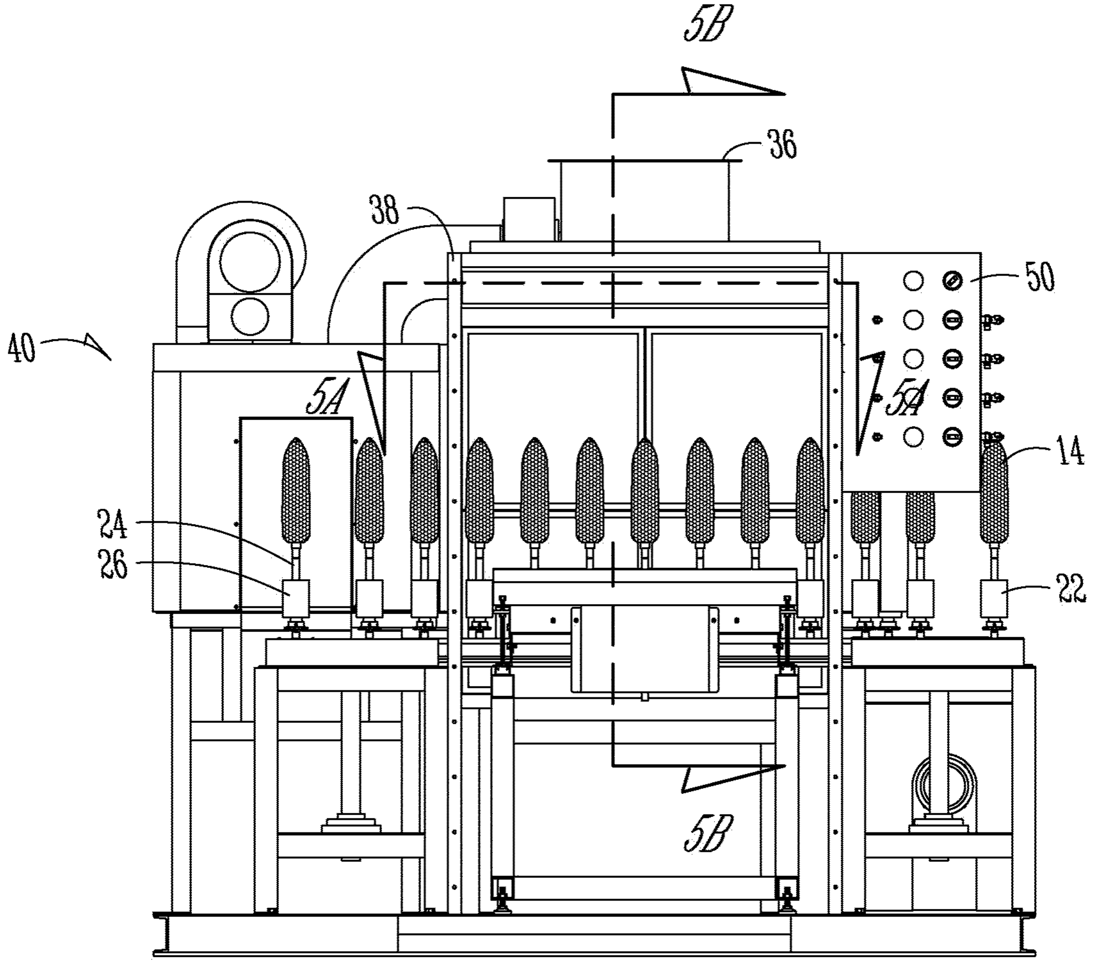
FIG. 4 is a side view of the apparatus shown in FIG. 1.
Figure 6:
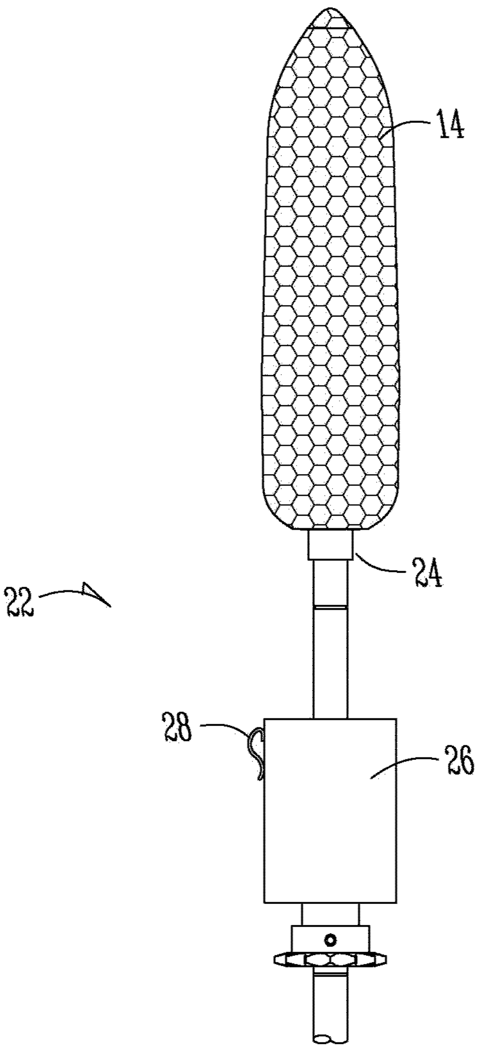
FIG. 6 is a side view of an indexed position on the chain drive.

As best shown in FIG. 2, chain drive 20 completely traverses the perimeter of table 12, passing through paint station 30 and dryers 40. The chain drive 20 features a number of indexed positions 22, one of which is shown in FIG. 6. According to the preferred embodiment, chain drive 20 comprises a #80 hollow pin chain on a 29' track. The chain drive 20 is driven by a number of 12" sprockets controlled by a ½ horsepower gear motor.

Referring now to FIG. 6, each indexed position 22 on the chain drive 20 features a stud 24 to which an ear of corn 14 is attached, a cup 26 for holding an identifier for an ear of corn 14, and a clip 28 as an alternative means to which an identifying tag might be attached. To prepare the ear of corn 14 for impalement upon stud 24, apparatus 10 may include one or more ear boring or drilling stations for creating a cavity in the shank, stem or cob portion of the ear. The cavity or void in the ear of corn 14 may be created using the "Apparatus, Method and System for Preparing Ears of Corn for Automated Handling, Positioning and Orienting" as shown and described in Provisional Application Ser. No. 61/153,543, filed Feb. 18, 2009, which application is assigned to the owner of the present application and incorporated by reference herein in its entirety. Preferably, the identifier is in the form of a tag, however other identifying means might be used, such as an envelope, a sleeve, a bag, a label, a barcode, an RFID, or any like identifying means.

Figure 5A:
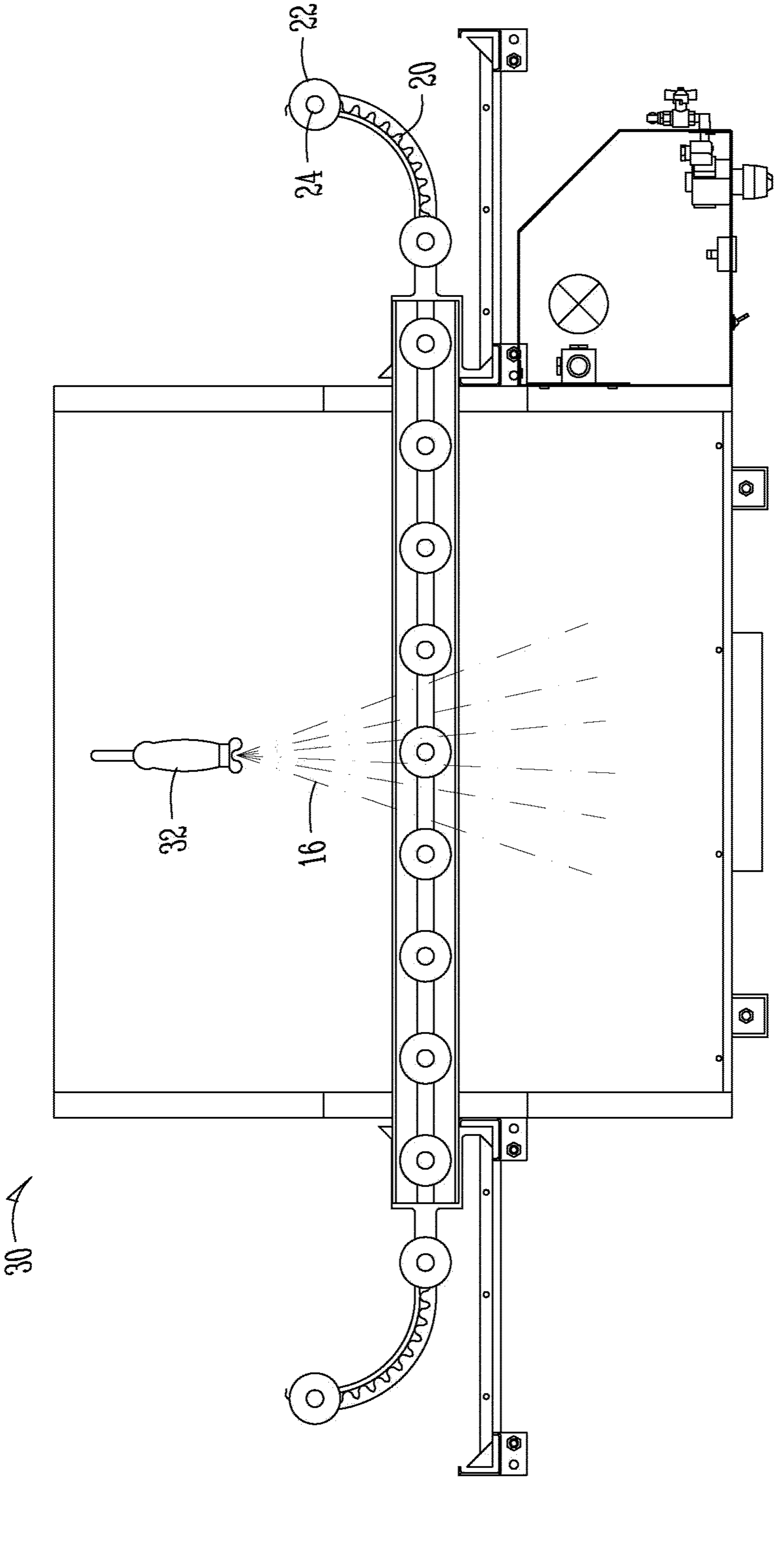
FIG. 5A is a top view of the paint booth, taken along line 5A-5A in FIG. 4.
Figure 5B:
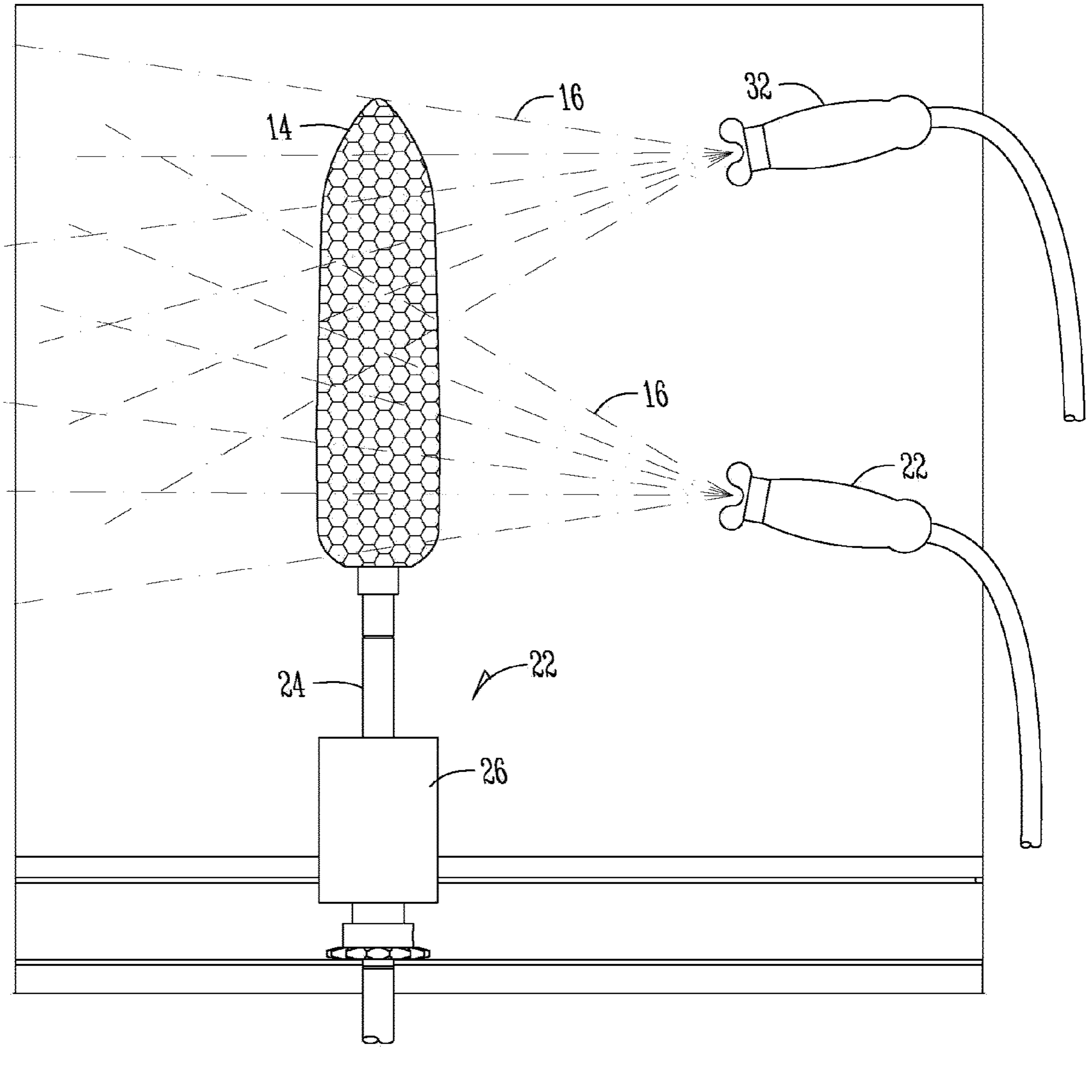
FIG. 5B is a side view of the paint booth taken along line 5B-5B in FIG. 4.

Referring now to FIGS. 5A and 5B the paint station 30 is shown. As shown in FIG. 5A, as the chain drive 20 passes the indexed positions 22 through the paint station 30, the gear 34 causes each indexed position 22 to rotate about its center stud 24. A pair of sprayers 32 are angled upwardly and downwardly at a fixed position, through which each indexed position 22 passes. The angle of the sprayers 32 and the rotation of each indexed position 22 ensures that the coating 16 is uniformly applied across the entire ear of corn 14. Paint station 30 also includes a ventilation system 36 which removes excess coating 16 from the enclosure 38. This ventilation system 36 eliminates the potential for airborne coating 16 to settle on the ear of corn 14, creating imperfections. The paint station 30 preferably also includes a light 48 so that an operator can ensure that each ear of corn 14 is properly coated. As previously described, the enclosure 38 is preferably transparent or has an opening through which an operator can visually inspect the ears of corn 14. According to the preferred embodiment, paint station 30 further includes an electronic control to engage the sprayers 32 when a sensor detects an ear of corn 14. The sprayers 32 are further controlled to minimize overspray. The magnetically active paint is stored in a stainless steel pressure tank to ensure even application of the paint, the tank including an agitator to keep the material in suspension.

Referring to FIG. 2, the apparatus 10 further includes a dryer 40. This dryer may be of any type commonly known in the art, such as infrared, convection oven, forced convection, vacuum, or other drying means. According to the preferred embodiment of the invention, the dryer 40 consists of an infrared oven 42 and a convection oven 44. The chain drive 20 passes each ear of corn 14 through this combination oven. In this manner the coating 16, which is preferably a high viscosity magnetically active paint, dries quickly and thoroughly thereby allowing the coated ears of corn 14 to be handled immediately upon leaving the dryer 40. According to a preferred embodiment, the dryer 40 comprises a floor-mount, ninety degree, in-line combination infrared/convection oven. The ears of corn 14 are preferably rotated through the oven to produce uniform drying. The preferred oven comprises a 21 kilowatt infrared oven operating between 100-150 degrees Fahrenheit with a 1500 cubic feet per minute recirculation fan and a 500 cubic feet per minute exhaust blower. The total time that each ear of corn resides in the oven is approximately 2.5 minutes.

While the above described apparatus is preferably intended for a single application of a coating 16 and a single pass through a dryer 40, it should be appreciated by those in the art that the coating 16 may require several applications, and therefore several paint stations. Additionally, several dryers and paint stations may be incorporated into the apparatus, thereby allowing several coats of a single material or multiple coats of different materials, with a drying phase after each application. The present invention also contemplates use in coating other types of seed.

Method

Figure 7:
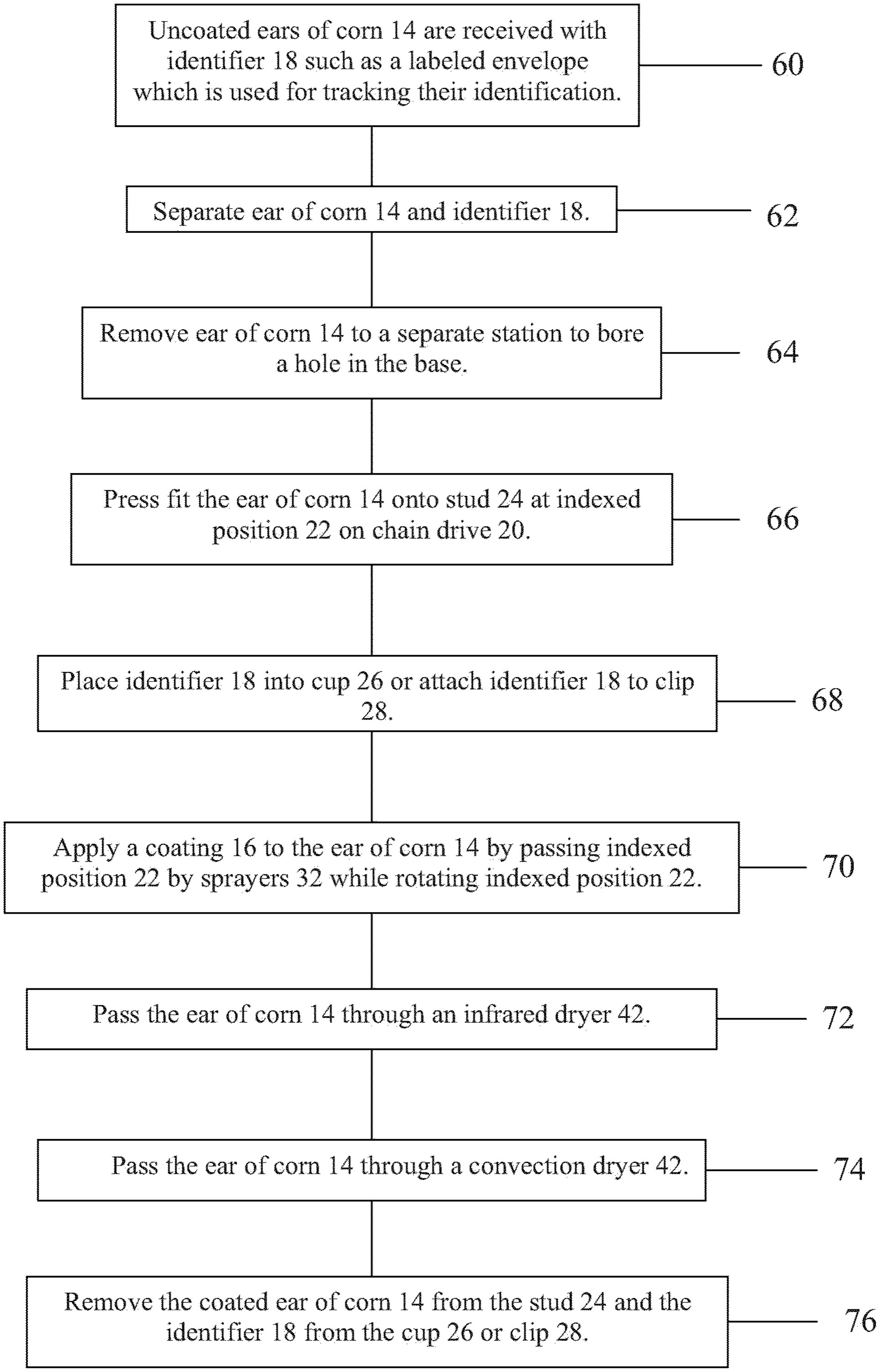
FIG. 7 is a flow diagram of a method for applying a coating to an ear of corn according to an exemplary aspect of the present invention.

Also disclosed by the present invention is a method for coating an ear of corn 14. The steps of this method are shown at FIG. 7. A brief overview of the process by which an ear of corn is coated is first presented, with more detailed references following. Reference will be made specifically to the flow diagram shown in FIG. 7.

According to an exemplary method of the present invention, in a first step 60 an ear of corn 14 may be received and then removed from identifier 18 (see step 62), the identifier 18 has information associated with it for tracking, indexing, and correlating a specific ear of corn 14 with a specific identifier 18. The ear of corn 14 is then subjected to a step 64 where a hole is bored into the base of the ear of corn 14. The hole may be bored into the stem, shank or cob portion of the ear of corn 14 using an ear boring station such as the "Apparatus, Method and System for Preparing Ears of Corn for Automated Handling, Positioning and Orienting" as shown and described in Provisional Application Ser. No. 61/153,543, filed Feb. 18, 2009, which application is assigned to the owner of the present application and incorporated by reference herein in its entirety. The hole allows the ear of corn 14 to be inserted onto the chain drive 20 at an indexed position 22 through the use of the stud 24 (see step 66). In the next step 68, the identifier 18 is then either inserted into the cup 26 or clip 28 associated with the indexed position 22. The chain drive 20 then advances the ear of corn 14 to the enclosure 38 of the paint station 30 where the ear of corn 14 is rotated by a gear 34 and passed before a pair of sprayers 32 (see step 70). The ear of corn 14 is then passed through an infrared dryer 42 (see step 72) and a convection oven 44 (see step 74) to dry the coating. Finally, the ear of corn 14 and identifier 18 are removed from the stud 24 (see step 76). The coated ear of corn 14 is therefore prepared for seed sampling, indexing, and laboratory testing.

In the first step 60, the ear of corn is received. Preferably an operator receives the ear of corn and inspects it for obvious damage or a missing identifier. The operator may also inspect for disease or other detrimental factors. Alternatively, the ear of corn may be automatically received by an automated process. Optical recognition software and cameras may perform an inspection; other sensors may determine weight, water content, color, and make other desirable, nondestructive determinations.

In the second step 62, the ear of corn 14 is separated from an identifier 18. The identifier 18 may consist of a tag, envelope, wrapper, barcode, RFID, or other identifying means. The information included on or referenced by the identifier 18 may indicate the origin of the ear of corn 14, the types of fertilizers and growing conditions, the phenotype and genotype information, genetic traits, or any other information which might be relevant to research. The identifier 18 is first removed from the ear of corn in order to prevent damage to the identifier 18. However, the identifier may be attached in a manner such that removal is not necessary, for example an RFID implanted within the cob of the ear of corn.

In the third step 64, the ear of corn 14 is attached to a drill press or other such device where a hole is bored into the base of the cob. The hole is of a diameter slightly smaller than the size of the stud 24. The smaller diameter of the hole relative to the stud 24 allows the cob to be pressed onto the indexed location, allowing the ear of corn 14 to be rotated as it passes through the paint station 30. Although this is the preferred embodiment, other alternatives may be utilized. For example, instead of a hole and a stud, the indexed position 20 might include a pair of prongs onto which the ear of corn is impaled. A pair of bores might also be used, or a single bore with one or more key slots corresponding to keys on the indexed position. Additionally, an attaching device might be attached to the ear of corn. Examples of such a device include a magnet, either on the ear of corn 14, the indexed position 20, or both; a snap-fit mechanical interface; a protrusion; a screw, either interacting with both the ear of corn 14 and the indexed position 20, or a ferrous screw and a magnet; a hook-and-loop system; a vacuum; or any such means known in the art.

In the fourth step 66, the ear of corn is attached to the indexed position 22 on the chain drive 20. The means of attaching the ear of corn to the chain drive varies according to the operation performed in the third step 64. Preferably, the ear of corn 14, having a hole in the base of the cob, is press-fitted onto a stud 24 at an indexed position 22. However, other alternative means of attaching the ear of corn to the chain drive are contemplated. The ear of corn 14 may be placed onto a magnetized surface, impaled upon one or more sharpened prongs, snap-fitted onto a male or female receiver, or any other process consistent with the selected attachment means.

In the fifth step 68 the identifier 18 is either deposited within the cup 26 or attached to the clip 28 associated with the indexed position 22. Various types of identifiers may be used, as described in the second step, allowing for a variety of attachment means. Printed barcodes may be clipped to the indexed position 22, while RFID or barcodes may be inserted into the cup 26. Additionally, the cup or clip may not be required. RFID implanted within the corn cob could transmit information to a receiver corresponding to the indexed position, or each RFID-enabled ear of corn 14 may be tracked as it is passed by a centralized receiver. The identifier also may not need to accompany the ear of corn 14 as it is painted and dried. A separate indexing station could hold identifiers 18, the identifier 18 and ear of corn 14 being correlated in some other manner, such as a turntable having a number of indexed clips corresponding to the number of indexed positions. The central object of this step is to ensure that the ear of corn is properly tracked, through any of the above means or others known in the art.

In the sixth step 70 the chain drive 20 passes the indexed position 22 through the paint station 30, where the ear of corn 14 is rotated by a gear 34 and coated by a pair of sprayers 32. This is the preferred embodiment, although other embodiments are also contemplated. The ear of corn 14 may be continuously rotated on the chain drive 20, or the paint station 30 may include a number of sprayers, eliminating the need to rotate the ear of corn 14 to ensure proper coverage. Additionally, the chain drive 20 may have a path whereby the ear of corn 14 is fully coated from a single nozzle or number of nozzles without the need to rotate the indexed position 22. The use of a gear 34 within the paint station 30 is one means of accomplishing the object of rotating the indexed positions 22. Other alternatives, such as a belt drive, electrical motors, magnetic induction, or other known means in the art may be used. Additionally, as described above, multiple paint booths may be used, either to apply a single coat of a material, or to apply multiple coats of one or more materials. Depending on the type of seed to be sampled, complete coating may not be necessary or preferable, therefore the particular method, apparatus and system for coating the ear of corn is dependant upon the process used.

In the seventh step 72 and eighth step 74, the coated ear of corn 14 is passed through an infrared oven 42 and a convection oven 44. The combination of these dryers serves to reduce uncertainty due to variations in local conditions which may lengthen drying time. Temperature and humidity are conditions which often vary, and are controlled by the ovens. Controls accessible to an operator are provided to allow adjustment. It is not necessary that two dryers 40 be used, or that an infrared oven 42 and convection dryer 44. The purpose of these two steps is to quickly dry the coating 16 onto the ear of corn so that the ear of corn may be handled without disturbing the coating 16. The number and type of dryers will depend on the type of seed to be sampled and the number and types of coatings to be applied to the seed. As above described, multiple coatings may be preferred, requiring multiple drying processes. According to the preferred embodiment, the ear of corn 14 is rotated as it dries.

In the final step 76, the coated ear of corn 14 and identifier 18 are removed from the apparatus. As discussed above, the identifier 18 need not be attached to the indexed position 22, and therefore the ear of corn 14 will either be indexed according to other means or the identifier 18 must be retrieved from a separate indexing location. The identifier 18 may also be removed at another location, but the intent of the identifier 18 is to provide valuable information to researchers, and therefore is preferably coupled with the coated ear of corn. The precise method of removing the ear of corn and identifier will depend on the methods of attachment for each, as discussed previously.

System

FIGS. 1-6 disclose generally a system 10 for coating an ear of corn in a resource efficient manner. One component of the system includes means 20 for providing automated movement of an ear of corn through the system. In one aspect, the moving means includes a plurality of separated positions 22 adapted for removable receipt of an ear of corn 14. The plurality of separated positions are preferably associated with a carousel, a chain, or a belt, such that movement of the carousel, chain or belt provides automated movement of the plurality of separated positions 22 through the various stations associated with the system 10. A work operation is performed on each of the ears of corn as ears of corn at each separated position are shuttled through the system. An ear of corn may be secured to the carousel, chain or belt using one or more types of retention means 24. Retention means of the invention could include at least a stud, such as a nail or shaft; one or more sharpened prongs oriented to retentively engage the ear of corn; a magnet for attracting and retaining a magnetically active or configured stem of the ear; a hook-and-loop fastener; an interference fit, such as where the stem is wedged between adjoining restrictive surfaces; an adhesive; a vacuum, such as where a port is adapted for receiving the stem of the ear of corn so as to be retained in the port using vacuum pressure; an expandable bladder, such as where the bladder expands radially inward upon the stem resting in a housing having the bladder; or any other like retention means capable of removable retention of an ear of corn at one of the separated positions.

The system also preferably includes means 30 for coating an ear of corn with a coating 16 while the ear passes through the system aboard the moving means 20. The coating preferably includes a magnetically active material, such as iron. In one aspect, the ear coating means could include means for bathing an ear of corn in a coating for applying the coating. In another aspect, the ear coating means could include means for spraying an ear of corn with a coating for applying the coating. The coating means could also include in another aspect means for rolling a coating onto an ear of corn. Various coating means along the lines of those considered above could include a spray coating applicator, an electrostatic coating applicator, an airbrush coating applicator, a roller coating applicator, or a bath coating applicator. The invention further contemplates that either or both the coating means and the moving means may be configured to rotate, orient or position an ear of corn while moving, coating and/or drying within the system.

The system also preferably includes automated drying means 40 for drying a coating applied to an ear of corn by the coating means. In the case where the system does not use an automated drying means, coatings applied to an ear of corn could be air dried. Automated air drying means 40 could include an air moving device and/or a heating element to facilitate rapid, automated drying of each applied coating. An example of a suitable means for drying the coating on an ear of corn could include an infrared oven, a convection oven, a forced air dryer, a vacuum dryer, or a pneumatic dryer.

To prepare the ear of corn for being secured at a separated space associated with the moving means, such as in the case where a spindle, post or nail is situated at each separated space, a ear boring or drilling station may also be included as part of the system. The ear boring/drilling station is preferably configured to create a cavity in the shank, stem or cob portion of the ear. The cavity or void in the ear of corn may be created using the "Apparatus, Method and System for Preparing Ears of Corn for Automated Handling, Positioning and Orienting" as shown and described in Provisional Application Ser. No. 61/153,543, filed Feb. 18, 2009, which application is assigned to the owner of the present application and incorporated by reference herein in its entirety. Using the void created in the ear, the ear may be retained upon one of the spindles, posts or nails associated with the moving means.

Each, several or a group of the separated positions 22 could include an identifier for indexing a separated position with a specific ear of corn. The identifier could include an envelope, a sleeve, a bag, a tag, a label, a barcode, or an RFID tag. The identifier allows the system or operator to track the immediate and post handling and processing of each ear or a group of ears.

The embodiments of the present invention have been set forth in the drawings and specification and although specific terms are employed, these are used in a generically descriptive sense only and are not used for the purposes of limitation. Changes in the formed proportion of parts, as well as in the substitutions of equivalences are contemplated as circumstances may suggest or are rendered expedient without departing from the spirit and scope of the invention as further defined in the following claims.

What is claimed is:

1. A method for high throughput coating of ears of corn comprising:

staging a plurality of ears of corn on an automated line;

passing said automated line through an ear coating process; and coating said plurality of ears of corn with a coating, such that for each ear of corn the coating is applied across the entire ear of corn, wherein said coating comprises a magnetically active coating.

2. The method of claim 1 further comprising the step of drying said plurality of ears of corn with a dryer.

3. The method of claim 1 further comprising the step of indexing at least one of said ears of corn with a position of said ear of corn on said automated line using an identifier.

4. The method of claim 1 wherein said coating step comprises:

a. bathing said ear of corn in a bath of said coating;

b. spraying said ear of corn with said coating; or c. rolling said coating onto said ear of corn.

5. The method of claim 4 wherein said spraying step comprises coating said ear of corn with a spray applicator.

6. The method of claim 4 wherein said bathing step comprises coating said ear of corn in a bath applicator.

7. The method of claim 4 wherein said rolling step comprises coating said ear of corn with a roller applicator.

8. The method of claim 2 further comprising the step of moving, rotating and/or altering orientation of said ear of corn during said coating and/or drying step to assist in coating said ear of corn and drying said coating.

9. The method of claim 2 wherein said drying step comprises exposing said coating to heat and/or moving air or gas.

10. The method of claim 3 further comprising the step of tracking at least one of said ears of corn through one or more of the steps on said automated line using said identifier.

11. The method of claim 1, wherein said staging a plurality of ears of corn on an automated line comprises staging a plurality of ears of corn on an apparatus that includes a chain drive having means for the chain drive to enter and exit an enclosure.

* * * * *